United States Patent
Kadu et al.

(10) Patent No.: US 10,223,774 B2
(45) Date of Patent: Mar. 5, 2019

(54) SINGLE-PASS AND MULTI-PASS-BASED POLYNOMIAL APPROXIMATIONS FOR RESHAPING FUNCTIONS

(71) Applicant: Dolby Laboratories Licensing Corporation, San Francisco, CA (US)

(72) Inventors: Harshad Kadu, Santa Clara, CA (US); Subhayan Mukherjee, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/648,125

(22) Filed: Jul. 12, 2017

(65) Prior Publication Data

US 2017/0308996 A1 Oct. 26, 2017

Related U.S. Application Data

(63) Continuation-in-part of application No. 15/418,199, filed on Jan. 27, 2017, now Pat. No. 10,032,262.

(Continued)

(51) Int. Cl.
*G06T 5/00* (2006.01)
*G06T 9/00* (2006.01)

(52) U.S. Cl.
CPC ............ *G06T 5/002* (2013.01); *G06T 9/00* (2013.01); *G06T 2207/20024* (2013.01)

(58) Field of Classification Search
None
See application file for complete search history.

(56) References Cited

U.S. PATENT DOCUMENTS

| | | | |
|---|---|---|---|
| 8,493,514 B2 * | 7/2013 | Choi | ............ H04N 9/73 345/590 |
| 9,264,681 B2 | 2/2016 | Gish | |

(Continued)

FOREIGN PATENT DOCUMENTS

| | | |
|---|---|---|
| WO | 2009/127231 | 10/2009 |
| WO | 2014/204865 | 12/2014 |

(Continued)

OTHER PUBLICATIONS

Pouli, Tania, and Erik Reinhard. "Progressive histogram reshaping for creative color transfer and tone reproduction." Proceedings of the 8th International Symposium on Non-Photorealistic Animation and Rendering. ACM, 2010.*

(Continued)

*Primary Examiner* — Andrae S Allison

(57) ABSTRACT

A processor for approximating a reshaping function using a multi-segment polynomial receives an input reshaping function. Given a number of target segments (N) and an initial maximum fitting error, in a first pass, it applies a first smoothing filter to the input reshaping function to generate a first smoothed reshaping function. Next, it generates a first multi-segment polynomial approximation of the input reshaping function based on one or more multi-segment polynomial approximation algorithms, the smoothed reshaping function, the number of target segments, and the initial maximum fitting error. The same process may be repeated in two or more similar passes that may include in each pass: reconstructing the reshaping function from the polynomial approximation of the previous pass, smoothing and segmenting the reconstructed reshaping function, and generating an updated multi-segment polynomial approximation according to an updated maximum fitting error.

14 Claims, 7 Drawing Sheets

Related U.S. Application Data

(60) Provisional application No. 62/334,099, filed on May 10, 2016, provisional application No. 62/290,399, filed on Feb. 2, 2016.

(56) References Cited

U.S. PATENT DOCUMENTS

| | | | |
|---|---|---|---|
| 2007/0086029 A1* | 4/2007 | Tsai | H04N 9/735 358/1.9 |
| 2008/0123952 A1* | 5/2008 | Parkkinen | G06T 5/009 382/168 |
| 2011/0054804 A1* | 3/2011 | Pfaff | G01N 30/72 702/25 |
| 2011/0110588 A1* | 5/2011 | Xie | G06T 5/009 382/167 |
| 2013/0051666 A1* | 2/2013 | Atkins | H04N 19/597 382/167 |
| 2014/0002737 A1* | 1/2014 | Damberg | G06T 5/009 348/488 |
| 2014/0160143 A1* | 6/2014 | Ballestad | G06T 5/009 345/589 |
| 2015/0071340 A1* | 3/2015 | Andersson | H04N 19/136 375/240.02 |
| 2015/0339808 A1* | 11/2015 | Tsuda | G06T 5/009 382/167 |
| 2016/0134872 A1* | 5/2016 | Su | H04N 19/176 375/240.03 |
| 2018/0020224 A1* | 1/2018 | Su | H04N 19/30 |

FOREIGN PATENT DOCUMENTS

| | | |
|---|---|---|
| WO | 2015/130541 | 9/2015 |
| WO | 2016/140954 | 9/2016 |

OTHER PUBLICATIONS

X. Jin, H. Han and Q. Dai, "Image Reshaping for Efficient Compression of Plenoptic Content," in IEEE Journal of Selected Topics in Signal Processing, vol. 11, No. 7, pp. 1173-1186, Oct. 2017.*

Taoran Lu, Fangjun Pu, Peng Yin, Jaclyn Pytlarz, Tao Chen, Walt Husak, Lu et al"Adaptive reshaper for high dynamic range and wide color gamut video compression," Proc. SPIE 9971, Applications of Digital Image Processing XXXIX, 9971 OB (Sep. 27, 2016).*

Pouli, Tania, and Erik Reinhard. "Progressive color transfer for images of arbitrary dynamic range." Computers & Graphics 35.1 (2011): 67-80.*

ITU-R BT.1886, "Reference Electro-Optical Transfer Function for Flat Panel Displays used in HDTV Studio Production" Mar. 2011, pp. 1-7.

Natale, D. et al "High Dynamic Range (HDR) Video Processing for the Exploitation of High Bit-Depth Sensors in Human-Monitored Surveillance" IEEE Applied Imagery Pattern Recognition Workshop, pp. 1-6, Oct. 14, 2014.

Pu, F. et al "Comments on Reshaping for HDR/WCG Compression" MPEG Meeting Oct. 2015, Geneva, Switzerland.

SMPTE ST 2084:2014 "High Dynamic Range Electro-Optical Transfer Function of Mastering Reference Displays" Aug. 16, 2014, pp. 1-14.

Stessen, J. et al "Chromaticity Based Color Signals for Wide Color Gamut and High Dynamic Range" MPEG Meeting, ISO/IEC JTC1/SC29/WG11, No. M35065, Oct. 1, 2014.

* cited by examiner

SINGLE-PASS AND MULTI-PASS-BASED POLYNOMIAL APPROXIMATIONS FOR RESHAPING FUNCTIONS

CROSS-REFERENCE TO RELATED APPLICATIONS

This application is a continuation in part of U.S. patent application Ser. No. 15/418,199, filed on Jan. 27, 2017, which claims the benefit of priority of the U.S. Provisional Patent Application Nos. 62/290,399, filed on Feb. 2, 2016, and 62/334,099, filed on May 10, 2016, each of which is incorporated herein by references in its entirety.

TECHNOLOGY

The present invention relates generally to images. More particularly, an embodiment of the present invention relates to single-pass or multi-pass based polynomial approximations for reshaping functions for coding images.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus, while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range.

As used herein, the term "forward reshaping" denotes the process of mapping (or quantizing) an image from its original bit depth and coding format (e.g., gamma or SMPTE 2084) to an image of a lower or the same bit depth and a different coding format, which allows for improved compression using a coding method (such as AVC, HEVC, and the like). In a receiver, after decompressing the reshaped signal, the receiver may apply an inverse reshaping function to restore the signal to its original high dynamic range. Receivers may receive the backward reshaping function as a look-up table (LUT) or in parametric form, e.g., as the coefficients of a multi-piece polynomial approximation of the function. As appreciated by the inventors here, improved techniques for image reshaping and for approximating reshaping functions are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Techniques for the efficient approximation of a reshaping function are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to approximating a reshaping function using a single-pass or a multi-pass process for determining a multi-segment polynomial representation. In an embodiment, in a first pass, a processor for approximating a reshaping function using a multi-segment polynomial receives a set of input and output points of an input reshaping function. For a number of maximum polynomial segments to represent the input reshaping function (N) and an initial maximum fitting error, first, the processor applies a first smoothing filter to the input reshaping function to generate a first smoothed reshaping function. Next, the processor generates using one or more iterations a first multi-segment polynomial approximation of the input reshaping function based on one or more multi-segment polynomial approximation algorithms, the first smoothed reshaping function, the number of maximum polynomial segments, and the initial maximum fitting error, wherein, in an iteration of the one or more iterations, a new maximum error fitting criterion is computed based on a number of output segments in the iteration and a fitting error between the smoothed reshaping function and a multi-segment polynomial approximation of the smoothed reshaping function in the iteration.

In another embodiment, in a second pass, the processor generates a second reshaping function based on the first multi-segment polynomial approximation of the input reshaping function, it applies a second smoothing filter to the second reshaping function to generate a second smoothed reshaping function, and for a second maximum fitting error, it generates using one or more iterations a second multi-segment polynomial approximation of the second reshaping function based on the one or more multi-segment polynomial approximation algorithms, the second smoothed reshaping function, the number of maximum polynomial segments, and the second maximum fitting error.

Example Video Delivery Processing Pipeline

Figure 1A:
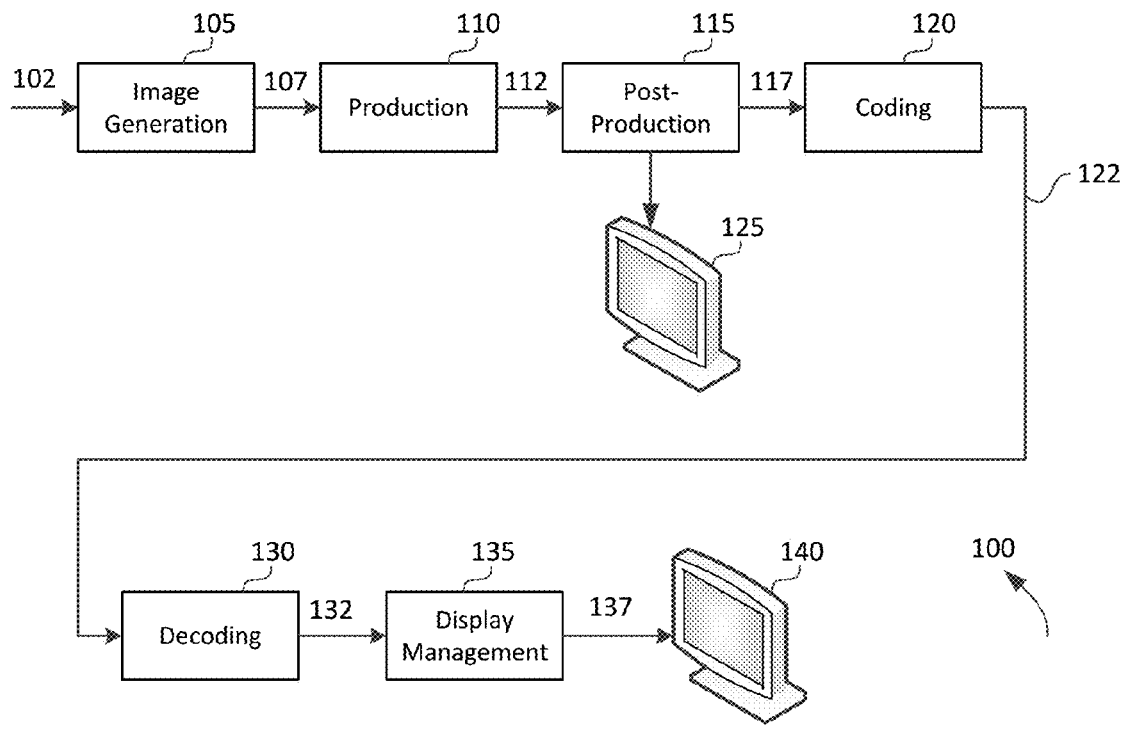
FIG. 1A depicts an example process for a video delivery pipeline.

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Currently, most digital interfaces for video delivery, such as the Serial Digital Interface (SDI) are limited to 12 bits per pixel per component. Furthermore, most compression standards, such as H.264 (or AVC) and H.265 (or HEVC), are limited to 10-bits per pixel per component. Therefore, efficient encoding and/or quantization is required to support HDR content, with dynamic range from approximately 0.001 to 10,000 $cd/m^2$ (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 cd/m², one 12-bit code value corresponds to a relative change of approximately 0.0048 cd/m²; however, at 1,000 cd/m², one 12-bit code value corresponds to a relative change of approximately 2.24 cd/m². This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames of a video), there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive PQ" or "Content-adaptive reshaping" denote methods to adaptively adjust the perceptually quantization of images based on their content.

Figure 1B:
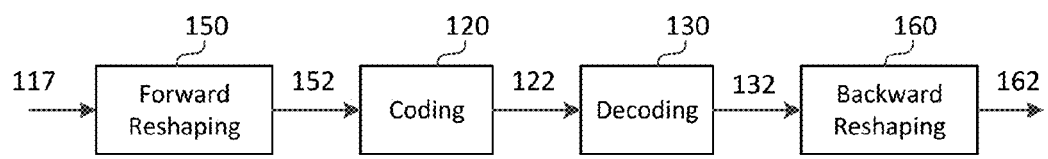
FIG. 1B depicts an example process for data compression using content-adaptive quantization or reshaping according to an embodiment of this invention.

FIG. 1B depicts an example process for content-adaptive reshaping according to an embodiment. Given input frames (117), a forward reshaping block (150) analyzes the input and the coding constrains and generates codeword mapping functions which map input frames (117) to re-quantized output frames (152). For example, input (117) may be gamma-coded or PQ-coded according to certain EOTF. In some embodiments, information about the reshaping process may be communicated to downstream devices (such as decoders) using metadata. Following coding (120) and decoding (130), decoded frames (132) may be processed by a backward reshaping function (160), which converts the re-quantized frames (132) back to the original EOTF domain (e.g., gamma or PQ), for further downstream processing, such as the display management process (135) discussed earlier. In some embodiments, the backward or inverse reshaping function (160) may be integrated with a de-quantizer in decoder (130), e.g., as part of the de-quantizer in an AVC or HEVC video decoder.

An example of a signal reshaping function was presented in U.S. Provisional Patent Application Ser. No. 62/126,925, filed on Mar. 2, 2015, "Content-adaptive perceptual quantizer for high dynamic range images," by J. Froehlich et al., which is incorporated herein by reference in its entirety, to be referred to as the '925 application, or the CAQ method. The same application has also been published as WO 2016/140954, for the corresponding PCT Application PCT/US2016/020230. According to the CAQ method, the reshaping function is computed according to a noise mask histogram of the input image. Alternative, block-based reshaping techniques are described next.

Block-Based Reshaping

Figure 2:
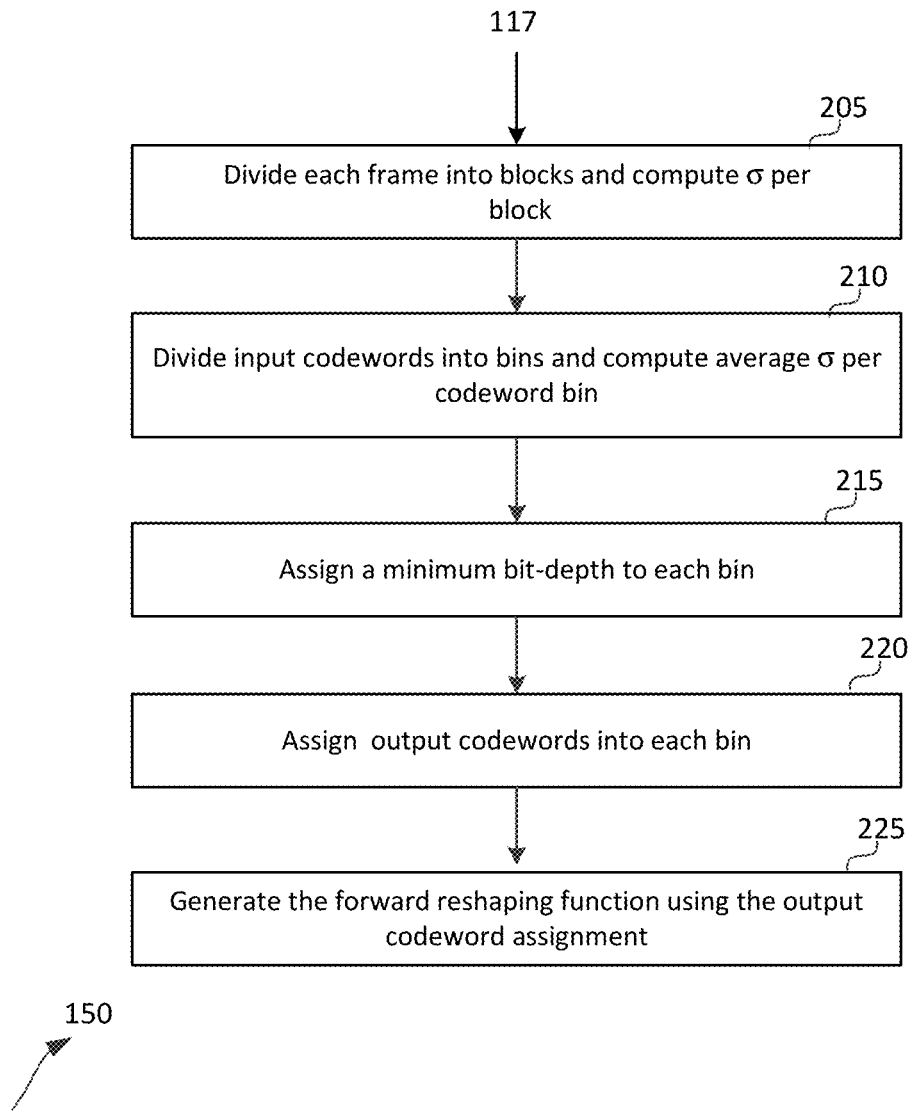
FIG. 2 depicts an example process for block-based, content-adaptive reshaping according to an embodiment of this invention.

FIG. 2 depicts an example process for block-based content-adaptive reshaping according to an embodiment of this invention. As depicted in FIG. 2, given a sequence of images (e.g., video frames) (117), in block (205), each image is divided into non-overlapping blocks and the standard deviation (u) for pixel values in each block is computed. In step (210), input codewords are divided into bins and the average standard deviation for each bin is computed. Block (215) computes the number of minimum bits required for each bin. Based on this information, in block (220), output codewords are assigned to each bin. Finally, in (225), a forward reshaping function is constructed based on the output codeword assignment. Each of these steps is described in more detail next.

In an embodiment, without limitation, let $I_j(p)$ denote the p-th pixel of a color component under quantization (e.g., luminance) in the j-th frame in the input sequence (117), normalized to [0 1). Let $v_{Lj}$ and $v_{Hj}$ denote the minimum and maximum pixel values in this frame, or $$v_{Lj} = \min\{I_j(p)\},$$

$$v_{Hj} = \max\{I_j(p)\}. \qquad (1)$$

Frame $I_j$ is divided into rectangular, non-overlapping blocks (e.g., into n×n blocks, where n=16). Denote the set of pixels within the k-th block as $\theta_{j,k} = \{p|p \in \text{block}(k)\}$. Then, the mean and standard deviation of the pixel values within the k-th, n×n, block may be computed as:

$$mean_{j,k} = \frac{\sum_{p \in \theta_{j,k}} I_j(p)}{n^2}, \qquad (2)$$

and $$\sigma_{j,k} = std_{j,k} = \sqrt{\frac{\sum_{p \in \theta_{j,k}} I_j(p)^2}{n^2} - mean_{j,k}^2}. \qquad (3)$$

In an embodiment, all pixels in the k-th block of the j-th frame are associated with the same standard deviation, $std_{j,k}$. Let $H_j(p)$ denote the standard deviation of all pixels in the j-th frame. In an embodiment, in the process of designing a reshaping function for frame j some pixels in $H_j(p)$ may be excluded. These pixels may include:

Pixels of a letterbox area within the input image (that is, dark areas added to a picture so its size matches a certain aspect ratio). Pixels in letterbox areas have constant values, hence zero standard deviation.

Pixels at the right- and bottom-ends of the frame. If the size of the picture does not accommodate an integer number of the n×n blocks, then pixel areas at the right- and bottom-ends of the frame, where their corresponding blocks have a smaller size, may be excluded.

Let $\Omega_j$ denote the set of valid (not excluded) pixel indices for the j-th frame. Let i be an index inside $\Omega_j$. Then, $$H_j(i), i \in \Omega_j \qquad (4)$$

denotes the set of valid standard deviations for all pixels in the j-th frame. Experimental results indicate that standard deviation maps provide a good, and simple to compute, representation of the underlying frequency content in each frame and thus can be used to decide how to allocate different bit depths to different regions in each frame. However, the methods described herein are equally applicable using alternative metrics of the complexity of an image block, such as their variance, their entropy, frequency response, and the like.

Let $B_I$ denote the bit-depth of the input image (117) (e.g., $B_I=16$) and let $K=2^{B_I}$, then the dynamic range 0 to K−1 may be partitioned into M bins of equal number (W) of input codewords, that is W=K/M. Let $b_{j,m}$ denote the average standard deviation of all valid pixels with input values belonging to the m-th bin, where m=0, 1, . . . , M−1. That is, for $I_j(i)$, $i \in \Omega_j$, if $$\Psi_{j,m} = \left\{ i \,\middle|\, \frac{m}{M} \leq I_j(i) < \frac{m+1}{M} \right\}, \qquad (5)$$

then $$b_{j,m} = \text{mean}\{H_j(i) | i \in \Psi_{j,m}\}. \qquad (6)$$

Note that for specific images there might exist some codeword bins with no pixels inside them. These bins may be marked so that they can be properly accounted for and/or adjusted in the next step.

Signal reshaping functions may be generated at the frame level or at the scene level. As used herein, the terms 'scene' or 'shot' for a video sequence may relate to a series of consecutive frames in the video signal sharing similar color and dynamic range characteristics. Because of the consecutive nature of video prediction in most video compression formats, it may be preferable to adjust the quantization parameters only at boundaries that match the typical boundaries of a video encoder, such as scene changes or a new group of pictures (GOP). Thus, given a scene with F frames and frame-based $b_{j,m}$ values, a scene-based measure of the standard deviation in each bin may be derived as $$b_m = \text{mean}\{b_{j,m} | j=0,1, \ldots, F-1\}. \qquad (7)$$

Figure 3:
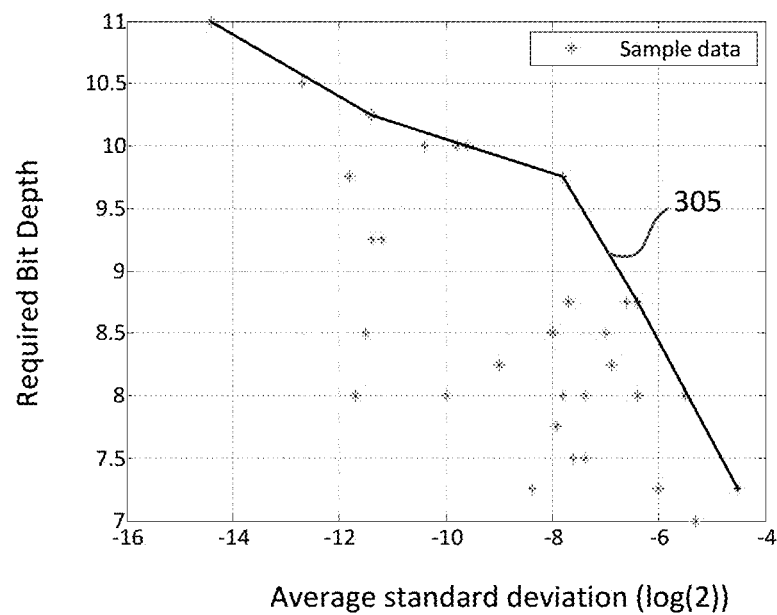
FIG. 3 depicts an example of a mapping function which maps average standard deviation values to required signal bit depth according to an embodiment of this invention.

For bins with no valid pixel values within a whole scene, in an embodiment, their standard deviation is set to a large number (say, 1 or higher) to guarantee that that no codewords are assigned to them. In another embodiment, let $v_L$ and $v_H$ denote the minimum and maximum pixel values within a scene, that is:

$$v_L = \min\{v_{Lj}\},$$

$$v_H = \max\{v_{Hj}\}, \qquad (8)$$

then for empty bins, the following process may be employed:
  If the luminance values in a bin are lower than $v_L$, then assign to this bin the same average standard deviation value as the closest bin to the right
  Else, if the luminance values in a bin are higher than $v_H$, then assign to this bin the same average standard deviation value as the closest bin to the left
  Else, interpolate the bin value from its neighbor bins Minimum Bit-Depth Per Bin Given the computed $b_m$ levels for a scene, the next step would be to determine the number of bits that need to be allocated for each bin. In an embodiment, such a mapping may be determined based on experimental user study results. For example, in one such study, users were shown to evaluate test images constructed as follows:
  a) A selection of 16-bit HDR frames was converted from the original RGB space to the color space to be used during the compression step (120)
  b) The color-transformed images were truncated (starting from the least significant bit (LSB)) to bit depths ranging from 7 bits to 11 bits
  c) The LSB-truncated images were converted back to the RGB color space
  d) Then, for each image, the minimum required bit-depth for which the output image does not exhibit any artifacts, such as false contouring, was determined FIG. 3 depicts an example of such results for a set of video data coded according to ST 2084. In FIG. 3, curve (305) represents the worst-case results for the tested images, thus representing the worst-case bit-depth requirements as a function of computed average standard deviation. From FIG. 3, for example, for an average standard deviation of $2^{-8}$, the required bit depth is about 9.75 bits. As expected, FIG. 3 indicates that image regions with higher levels of complexity can be coded at smaller bit depths. Alternatively, the smoother the image, the more bit depth is needed for an accurate and perceptually lossless representation.

Given a set of average standard deviation values, $std_i$, i=0, 1, 2, . . . , N−1, where $std_i \leq std_{i+1}$, let $\tilde{Q}_i$ denote the corresponding computed minimum bit depth. Based on these samples, one may derive a standard deviation to bit-depth allocation function $f_B(\ )$, so that $$Q_m = f_B(b_m), \qquad (9)$$

In an embodiment, $f_B(\ )$ can be a piece-wise linear function computed using linear interpolation. For example, for $$std_n \leq b_m \leq std_{n+1} \qquad (10)$$

$$Q_m = \tilde{Q}_n - (\tilde{Q}_n - \tilde{Q}_{n+1}) \frac{b_m - std_n}{std_{n+1} - std_n}.$$

However, other interpolation techniques known in the art, such as bilinear interpolation, spline interpolation, and the like, could also be used.

In an embodiment, it may be more convenient to perform codeword mapping (220) based on the number of required codewords within each bin instead of using the bit depth data directly. This is examined in the next section.

Codeword Mapping Generation

Let $B_T$ denote the target bit-depth for the re-quantized signal (152) (e.g., $B_T=10$ bits/pixel per color component), then the output will be mapped using $2^{B_T}$ codewords. In an embodiment, the range of codewords is normalized to be in [0, 1), hence let $$D_m = \left( \frac{2^{Q_m}}{2^{B_T}} \right) \bigg/ 2^{B_I}. \qquad (11)$$

denote the number of required normalized codewords per bin m. For example, if $Q_m=9$, $B_I=16$ and $B_T=10$, then $D_m=2^{-17}$.

Let $$d_i = D_m \text{ for } (m-1)W \leq i < mW, \qquad (12)$$

denote the number of normalized codewords per input $i \in (0, 2^{B_I}-1)$, then $d_i$ can be considered a lower bound for the number of required codewords per input codeword. The total number of normalized codewords for all output codewords, D, is bounded by 1, or $$D = \sum_{i=v_L}^{v_H} d_i \leq 1. \quad (13)$$

Let U=1−D denote the number of unused normalized codewords after applying equation (12). These unused codewords need to be reassigned to output codewords according to a given criterion. In an embodiment, using a constant allocation scheme, for input $v_L \leq i \leq v_H$, the same amount of additional codewords are assigned based on the existing distribution, or $$\tilde{d}_i = d_i + \frac{U}{v_H - v_L}, \quad (14)$$

where $\tilde{d}_i$ denotes the updated number of normalized codeword values. Additional reallocation techniques were also presented in the '925 application. In this invention, another codeword allocation scheme based on computed entropy is also proposed as follows.

Consider a region $\Omega_i$ surrounding the i-th pixel in the j-th frame (e.g., a 5×5 area with the i-th pixel in the center), then the entropy of the i-th pixel may be computed as $$E_j(i) = \sum_{k \in \Omega_i} -p(k)\log(p(k)), \quad (15)$$

where p(k) denotes an empirical probability for the occurrence of pixel value k. For example:

$$p(k) = \frac{|\{y = k \mid y \in \Omega_i\}|}{|\Omega_i|},$$

where |X| denotes the number of elements in set X.

Without loss of generality, in an embodiment, let $$E_j^{(NL)}(i) = E_j(i)^{1/2} \quad (16)$$

represent a non-linear mapping of the entropy values so that more codewords are allocating to regions of higher complexity while smoother areas, with low entropy, are also guaranteed not to get too few codewords, thus preventing coding artifacts. After normalizing with the maximum entropy value within each frame, the final entropy of the j-th frame is given by $$E_j^{(NL)}(i) = E_j^{(NL)}(i) / \max_i E_j^{(NL)}(i). \quad (17)$$

Let $E_{j,m}$ denote the mean entropy within each codeword bin m in the j-th frame, and let $E_m$=mean($E_{j,m}$|j=0, 1, . . . , F−1) denote the average entropy in each codeword bin within a scene, then, in an embodiment, for $v_L \leq i \leq v_H$, unused codewords are allocated based on $$\tilde{d}_i = d_i + a\left(\frac{U}{v_H - v_L}\right) + (1-a)\left(\frac{e_i}{S_e}\right), \quad (18)$$

where a is a constant between 0 and 1 (e.g., a=0.1) that determines what proportion of the unused codewords is assigned using a constant allocation scheme, e.g., as in equation (14), and what proportion takes into consideration the computed entropy values, $$e_i = E_m \text{ for } (m-1)W \leq i < mW, \quad (19)$$

and $$S_e = \Sigma_i e_i \text{ for } v_L \leq i \leq v_H. \quad (20)$$

In another embodiment, let $$u_i = U \cdot \left(\frac{i - v_L}{v_H - v_L}\right)^\alpha, \text{ for } v_L \leq i \leq v_H, \quad (21)$$

where α is a constant (e.g. α=1.4). Then, unused codewords are allocated based on $$\tilde{d}_i = d_i + (u_i - u_i), \text{ for } v_L+1 \leq i \leq v_H. \quad (22)$$

Experimental results have indicated that this allocation scheme tends to preserve better film grain, camera noise, or details at certain high bit rates.

In an embodiment, the allocation curves may also be smoothed using a low-pass filter or a moving average filter to ensure the curve is smooth and the inverse reshaping function is easy to approximate using a piece-wise polynomial. For example, in an embodiment $$\tilde{s}_i = \sum_{k=-W}^{W} a_k \cdot \tilde{d}_{i+k}, \quad (23)$$

$$\text{where } a_k = \frac{1}{2W + 1}.$$

In an embodiment, no codewords are assigned to values outside the ($v_L$, $v_H$) range, or $$\tilde{s}_i = 0 \text{ for } i < v_L \text{ and } i > v_H.$$

Furthermore, in case the sum of smoothed values exceeds 1, the codeword assignment needs to be normalized. For example, if $$S = \sum_{i=v_L}^{v_H} \tilde{s}_i > 1, \quad (24)$$

then $$s_i = \frac{\tilde{s}_i}{S}.$$

Given the final allocation of codewords in each codeword bin, a forward reshaping function may be generated as $$FL(i) = \sum_{k=0}^{i} s_k. \quad (25)$$

Given FL(i), then, in the j-th frame, for a given input pixel $l_j(p)=i(i\in(0, 2^{B_I}-1))$ the final, normalized, re-quantized pixel value $s_{jp}$ may be expressed as:

$$s_{jp} = \begin{cases} 0, & \text{if } i < v_L \\ 1, & \text{if } i > v_H \\ FL(i), & \text{if } v_L \le i \le v_H \end{cases} \quad (26)$$

In an embodiment, FL(i) values may be stored in a pre-computed look-up table (LUT). Alternatively, normalized $s_{jp}$ values may also be mapped to de-normalized values in the range 0 to $2^{B_T}-1$.

Figure 4:
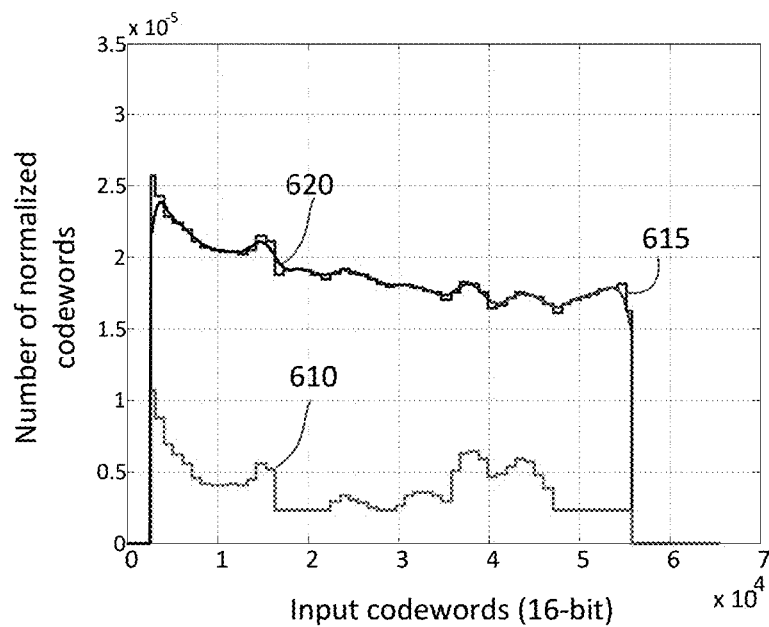
FIG. 4 depicts examples of computed normalized codeword allocations according to embodiments of this invention.
Figure 5:
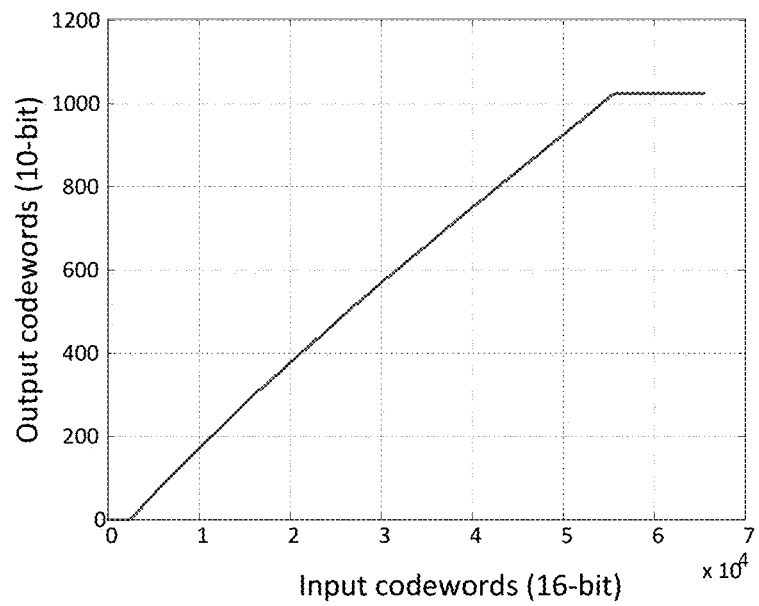
FIG. 5 depicts an example of a forward reshaping function computed according to an embodiment of this invention.

FIG. 4 depicts example plots for codeword allocation according to embodiments. Plot (610) shows the original allocation based on the computed lower bit-depth values (e.g., using equation (12)) for a scene, for $B_I=16$ (input codewords range from 0 to 65,535). FIG. 4 also shows the number of normalized codewords after the final allocation, using both smoothed (620) and unsmoothed (615) curves. FIG. 5, depicts an example look-up table for reshaping 16-bit input data into 10-bit output data according to embodiments of this invention.

People skilled in the art will appreciate that while the methods discussed herein are based on a block-based measure of standard deviation, other measures of block complexity, such as their variance, entropy (for example, as computed in equation (15)), frequency transform components, and the like, may also be applied.

Backward or Inverse Reshaping

In some embodiments, backward reshaping (160) may be applied to reverse the effects of forward reshaping (150). In an embodiment, a look-up table for inverse quantization may be constructed as follows:
a) For each codeword in the quantized domain ($s_c$), identify all input codewords ($v_i$) for which $FL(v_i)=s_c$. Let this group be denoted as $\omega(s_c)=\{v_i|FL(v_i)=s_c\}$; then
b) Construct the backward reshaping function ($BL(s_c)$) as a function of $\omega(s_c)$.
For example, in an embodiment, without limitation, $BL(s_c)$ may be constructed as the average of all codewords that belong to $\omega(s_c)$, or if $|\omega(s_c)| > 0$, (27)
then $$BL(s_c) = \frac{\sum_{i\in\omega(s_c)} v_i}{|\omega(s_c)|},$$

where $|\omega(s_c)|$ denotes the number of elements in the set $\omega(s_c)$. If $|\omega(s_c)|=0$ for any $s_c$ values, in an embodiment, these values may be interpolated from its neighbor non-zero values. In another embodiment, backward reshaping may be defined as $\min(\omega(s_c))$.

Polynomial Approximation of a Backward Reshaping Function

Given a backward reshaping function, regardless of how it has been generated, this section elaborates on a single-pass or a multi-pass technique to derive its efficient polynomial approximation. It is desirable that a reconstructed backward reshaping function is a monotonically increasing function. Furthermore, it is desirable that there are no jumps or discontinuities at the pivot points that segment the function, since such jumps may manifest as spatial banding artifacts in the reconstructed output image. Hence, in some embodiments, it may be necessary to apply multiple polynomial approximation passes to the generated backward reshaping LUT, until the result function satisfies both error-approximation requirements and the monotonicity and "smooth" pivot point constrains.

In terms of terminology, a backward reshaping function or LUT (BLUT) (e.g., as the one generated in equation (27)) received by the multi-piece polynomial approximation method is represented by $\omega^{(j)}(\cdot)$ in the j-th pass. After smoothing $\omega^{(j)}(\cdot)$ with a smoothing filter, the smoothed BLUT is denoted by $\Omega^{(j)}(\cdot)$. The LUT reconstructed from the polynomial approximation is denoted as $\Psi^{(j)}(\cdot)$. The superscript j will be dropped when the pass number is irrelevant to the method under discussion. The input and output values will be represented by s and v respectively.

Figure 6A:
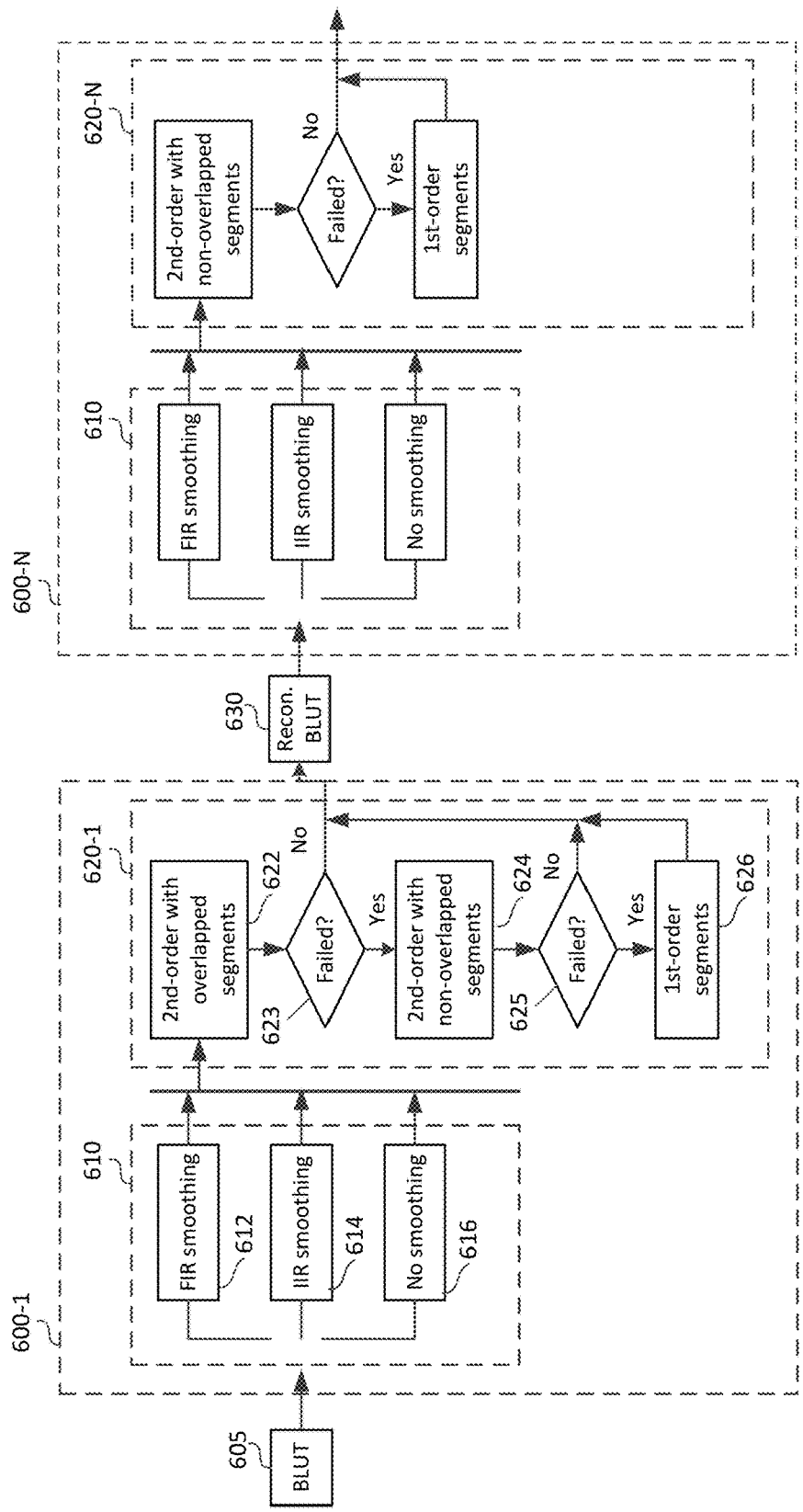
FIG. 6A-6C depict example processes for single-pass and multi-pass based polynomial approximation of a backward reshaping function according to embodiments of this invention.

FIG. 6A depicts an example process for a multi-pass based polynomial approximation of a backward reshaping function. As denoted in FIG. 6A, each pass (600-1, 600-N) comprises two stages (610 and 620-1, or 610 and 620-N). The first stage (610) may apply a smoothing filter to remove any small irregularities in the input BLUT (605). BLUT functions with irregularities are in general hard to approximate using second-order polynomial functions, so this smoothing assists in the fitting process. Examples of a smoothing filters include FIR (612) and IIR (614) smoothing filters, which will be discussed in more detail later on. In some embodiments, to expedite processing, or under certain other conditions, smoothing may be skipped (step 616).

After smoothing (610), in the second stage (620), one or more polynomial fitting schemes may be applied to the smoothed BLUT. In an embodiment, without limitation, three such techniques are applied: a) a second order polynomial approximation using overlapped segments, b) a second order polynomial approximation using non-overlapped segments, and c) a piecewise linear approximation. If at least one of the three polynomial fitting schemes provides a satisfactory approximation, then, the process inside the j-th pass terminates, a reconstructed BLUT is created (630), and the process, if needed, moves to the subsequent (j+1) pass. At the end, a sequence of polynomial coefficients representing the polynomial approximation is generated, to be passed to the decoder as part of the bitstream, e.g., as metadata.

In stage 620, some embodiments may apply only a subset of the available piece-wise polynomial approximation techniques. As will be described later, in some embodiments, the first stage (600-1) may provide a very coarse approximation, with relatively high approximation error, which may be refined in subsequent passes, depending on computation resources. For example, a server farm in a movie studio may use a multi-pass approach, but a mobile phone recording HDR content may use a simpler, single-pass approach.

In stage 620, polynomial approximations may be performed using either forward polynomial fitting or backward polynomial fitting. In forward fitting, given M input codewords, pivot points for each segment are determined starting at so (or its normalized representation, e.g., 0) and moving towards $s_{M-1}$ (or its normalized representation, e.g., 1). In backward fitting, pivot points are determined starting at $s_{M-1}$ and moving towards $s_0$. In some embodiments, an encoder may try both forward and backward fitting and select the one that yields the approximation with the smallest fitting error between the two.

BLUT Smoothing

In one embodiment, the BLUT may be smoothed using an FIR, moving-average, filter. This filter takes the mean of all the data points within a data window and replaces the current value with the average. In an embodiment, the filter may scan the entire curve twice. The length of the window can be adaptively chosen based on the position of the center of the window on the backward reshaping LUT. When the center of the window is at the beginning or near the end of the interval [a, b], the window length is smaller so that the window stays within the bounds of the curve.

Let $\omega(\cdot)$ denote the original backward reshaping LUT, let $\Omega(\cdot)$ denote the smoothened backward LUT, and let $2n+1$ denote the total length of the window centered at t. Then, the equation for the adaptive moving average filter can be formulated as:

$$\Omega(t) = \frac{1}{\min(t+n, b+1) - \max(t-n, a-1)} \sum_{i=\max(t-n,a-1)}^{\min(t+n,b-1)} \omega(i). \quad (28)$$

This filter works well when there are discontinuities in the form of abrupt jumps and some simple irregularities in the curve. The filter might not perform that well when there are sharp, e.g., first-order, discontinuities, in the curve.

In another embodiment, an exponential IIR filter may be used. The exponential smoothing filter is an IIR filter specifically suited for curves with irregularities and sharp first order discontinuities. The smoothened curve $\Omega(\cdot)$ can be expressed as, $$\Omega(0) = \omega(0).$$

For $t > 0$, $$\Omega(t) = \rho * \omega(t) + (1-\rho) * \omega(t-1). \quad (29)$$

The filter has only two taps, so it is computationally more efficient than the windowing filters. The $\rho$ parameter has to be tuned for frame-wise and scene-wise curves separately. The filter might not be very effective when there are large jumps or discontinuities in the curve. As used herein, the term "frame-wise" denotes that a BLUT is generated at the frame level. As used herein, the term "scene-wise" denotes that a BLUT is generated at the scene level (e.g., see discussion after equation (6).)

Approximation Using Non-Overlapped Second-Order Segments

Under this method (624), the BLUT is approximated with segments that have at most their pivot points in common, that is, the polynomial segments may be either touching each other at the pivot points or they may be disjoint. The non-overlapping method provides a stable and accurate fit in general, but it might create abrupt jumps at the segment boundaries (from the last pivot point of the previous segment to the first pivot point of the current segment). These abrupt jumps at the pivot points might cause spatial banding artifacts.

In the context of any generic reshaping function being approximated by multiple second order polynomials, let the normalized (e.g., in [0,1)) value $s_{pi}$ denote the i-th input pixel intensity (e.g., SDR) in the p-th polynomial segment. Let $v_{pi}$ be the co-located output pixel value corresponding to $s_{pi}$, and let $\hat{v}_{pi}$ denote the predicted output value for $s_{pi}$. Given input $s_{pi}$, the predicted value $\hat{v}_{pi}$ using the second-order polynomial coefficients $\{m_{p,0}, m_{p,1}, m_{p,2}\}$, can be expressed as, $$\hat{v}_{pi} = m_{p,0} + m_{p,1} \cdot s_{pi} + m_{p,2} \cdot (s_{pi})^2. \quad (30)$$

Given a set of $s_{pi}$ and $v_{pi}$ values, in an embodiment, the polynomial coefficients in equation (30) can be determined using known in the art polynomial fitting methods, such as minimizing the mean square error between $v_{pi}$ and $\hat{v}_{pi}$ values.

In an embodiment, one may want to enforce a continuity constraint between two consecutive segments, wherein the starting point of the p-th polynomial corresponds to the end-point of the p−1-th polynomial. Denote the input value at the ending point of p−1-th segment of the polynomial as $s_{p-1}$. The corresponding output value may be obtained as $$\hat{v}_{p-1} = m_{p-1,0} + m_{p-1,1} \cdot s_{p-1} + m_{p-1,2} \cdot (s_{p-1})^2. \quad (31)$$

In the p-th segment, the prediction function may be expressed as $$(\hat{v}_{pi} - \hat{v}_{p-1}) = mt_{p,1} \cdot (s_{pi} - s_{p-1}) + mt_{p,2} \cdot (s_{pi} - s_{p-1})^2. \quad (32)$$

With this constraint, it is also ensured that in the next segment, the input value of $s_{pi} = s_{p-1}$ will be mapped to predicted value $\hat{v}_{p-1}$. As before, an optimum solution for the $mt_{p,1}$ and $mt_{p,2}$ polynomial coefficients may be determined in the MSE sense or any other optimization criterion.

Using a single-segment fitting method as the building block, the entire multi-segment polynomial fitting for an interval [a, b] can be summarized as follows. In forward fitting, the first pivot point is set to point a. First, the end-point is chosen to be a+1, and a fitting polynomial is computed using the methods described earlier. Then, the end-point is moved to a+2, a+3, and so on. As used herein the term "a+k" denotes either the k-th symbol subsequent to a, or if the symbols are normalized, a distance D*k from a, where D is the minimum distance between two possible pivot points. A second order polynomial is found for each of those cases. The process is repeated until the polynomial fitting error exceeds the maximum allowed target distortion. For example, if the maximum error at a+k exceeds the maximum target distortion, then the end point of the segment is fixed to be a+k−1. Then, under the discontinuous condition, the next segment of the polynomial begins at the point a+k. For the continuous condition, the next segment starts at the point where the previous segment ends, i.e., a+k−1. The entire process continues until end-point b is reached. In backward fitting, the process starts at b and continues backwards until it reaches point a. Given a target of N segments, (e.g., N=8), the resulting multi-piece polynomial might have less than N, more than N, or exactly N segments. As will be discussed later, at that point, a number of termination criteria may be tested, and the polynomial fitting process may either be terminated, or it may be repeated several times until a reasonable fitting is achieved.

Experimental results have shown that a forward fitting yields more accurate representation in the darks, while a backward fitting yields a more accurate representation at the highlights. In an embodiment, one may perform both forward and backward fitting and select the one with the minimum overall fit error.

Approximation Using Overlapped Second-Order Segments

The problem of abrupt jumps at segment boundaries can be mitigated with the segment-overlapping method (622). In this method, the current polynomial segment shares some data points with the previous and the future segments. This allows for smooth transition at segment boundaries, but the overall fit may not be as accurate as the non-overlapping method (e.g., the overall MSE error may be higher). Since the overlapping method may occasionally violate the monotonically increasing constraint at the pivot points, an extra constraint is added to ensure the desired monotonically increasing characteristics of the reconstructed backward LUT at the decoder side. With the additional constraint, the overlapping method might fail to generate a feasible solution for the multi-piece fitting problem. If that happens (623), one may apply polynomial fitting without overlapping segments (624). In an embodiment, overlapping is enabled only for discontinuous segments.

Note also that after the first pass (600-1), subsequent passes (e.g., 600-N) may not include polynomial approximation with overlapped segments any more, since the reconstructed BLUT (630) may not have gaps anymore, or it may be substantially smooth.

Consider l as the starting point of the current polynomial segment in the forward fitting process. Suppose we are fitting a polynomial from (l, l+w), where l+w is a point at distance of w from l. Without the continuity constraint, the multi-segment polynomial fitting might have a jump at the segment boundaries, i.e. from l−1 to l. Similarly, a jump may occur at the end point of the polynomial segment.

Taking into account a few points before l and after l+w will make the fitting smoother at the pivot points and reduce the "jump" from l−1 to l. Those few points are the overlapping points. In an embodiment, for 8-bit backward reshaping LUTs, up to five overlapping points are considered. For 10-bit backward LUTs, up to 20 points are considered. Even if some extra points before and after the start and end points are considered, the current polynomial segment still spans the range (l, l+w). When overlapped segments are considered, similar techniques as used before may be applied. For example, starting at pivot point l, and given θ overlap points, one may solve equation (31) for input and output values from l−θ, up to l+1, l+2, etc., until the distortion exceeds the predetermined upper approximation distortion threshold.

Consider $\Omega(\tilde{s}) \to \tilde{v}$ as the smoothened backward LUT, and let $\Psi(\tilde{s}) \to \tilde{v}$ be the multi-piece polynomial fitting of $\Omega(\cdot)$, where $\tilde{s}$ and $\tilde{v}$ represent, respectively, the normalized input (e.g., SDR) and the mapped output (e.g., EDR) values. Note that $\Omega(\cdot)$ is monotonically increasing function. Overlapping might result in the cases where the multi-piece polynomial fitting curve $\Psi(\cdot)$ might not be monotonically increasing at the pivot points. Thus, an extra condition must be added to the segment termination condition to avoid this problem. For a forward fitting process, if the current polynomial segment spans points in the range (l, l+w), then the monotonically increasing constraint is violated in $\Psi(\cdot)$ when:

1) $\Psi(l-1) > \Psi(l)$,

2) $\Psi(l+w) > \Omega(l+w+1)$. (33)

Thus, if the above conditions are violated, the polynomial segment has to be terminated at point l+w−1.

For a backward fitting process, the scenarios for violations are as follows:

1) $\Psi(l+w+1) < \Psi(l+w)$,

2) $\Psi(l) < \Omega(l-1)$. (34)

These tests allow for the "monotonically-increasing" requirement to be met.

Approximation Using Linear Segments

When either of the second-order polynomial approximation schemes (622, 624) fail (623, 625), one may revert to a simple linear approximation (626). Under this scenario, the entire input range [a, b] is distributed into N equal intervals (e.g., N=8). Suppose one of the intervals spans the input range $\{s_1, s_2\}$, then the linear segment for that interval can be expressed with the equation $y - v_1 = m(x - s_1)$, where $$m = \frac{v_2 - v_1}{s_2 - s_1}.$$

Under the continuity constraint, the next segment starts at $s_2$, otherwise (with no continuity constraint), the next segment starts at the next codeword after $s_2$, $s_2+1$.

Termination Conditions

Either one of the multi-segment polynomial fitting processes (620) should terminate if a desired feasible solution is found. Sometimes the process might get stuck in a loop where the new iteration does not improve the solution of the previous iteration. In other cases, the fitting process might exceed the maximum number of allowed fitting iterations. In these extreme cases, the algorithm should be terminated, since continuing with the fitting process might not improve the current solution any further.

In an embodiment, example termination conditions for the multi-segment fitting process are listed below.

1) Sometimes the algorithm might produce a solution with less than N segments but with error less than 12- or 14-bit accuracy Δ. For example, for 12-bit data, $\Delta = \frac{1}{2}^{12}$, and for 14-bit data, $\Delta = \frac{1}{2}^{14}$. In that case, it is safe to terminate the fitting process as the current solution is good enough for all practical purposes. This may be expressed as: terminate if $e^{(k)} < \Delta$ and $n^{(k)} < N$, where $e^{(k)}$ denotes the fitting error at the k-th iteration and $n^{(k)}$ denotes the number of polynomial segments at the k-th iteration. In embodiment, as an example, the fitting error may be computed as:

$e^{(k)} = \Sigma_i (\tilde{v}_i - \hat{v}_i^{(k)})^2$, or as $$e^{(k)} = \max_i \left| \tilde{v}_i - \hat{v}_i^{(k)} \right|,$$

where $\tilde{v}_i$ denotes the values of the smoothed backward reshaping function and $\hat{v}_i^{(k)}$ denotes the corresponding values using the multi-segment approximation at the k-th iteration.

2) If the algorithm gets stuck in a loop such that the fitting error and the number of segments do not change from one iteration to then next, then it is safe to terminate the fitting process. That is, terminate if $e^{(k)} \approx e^{(k-1)}$ and $n^{(k)} = = n^{(k-1)}$.

3) Terminate if the current solution has exactly N segments. That is, terminate if $n^{(k)} = = N$.

4) Terminate if the maximum number of fitting iterations (e.g., K) is reached without finding exactly an N-piece solution. One can still have a solution in this case with less than N segments. That is, terminate if $k = = K$ $n^{(k)} \leq N$.

Let $d^{(k)}$ denote the maximum allowed error at the k-th iteration (that is $e^{(k)} \leq d^{(k)}$). The target maximum distortion (or max error threshold) plays a pivotal role in determining the accuracy of the overall multi-segment fitting process. If the error threshold is too large, the fitting solution might have fewer than N segments. On the other hand, if the error threshold is too small, the algorithm might not be able to find an N-segment solution. Hence, in an embodiment, to find the best N-segment polynomial solution, the threshold may be adjusted at each iteration as needed.

Given an initial value for $d^{(0)}$ (e.g., $d^{(0)}=0.10$ for N=8), in an embodiment, and without limitation, $d^{(k)}$ values may be adjusted for k=1, 2, . . . , K−1, as follows.

a) if $n^{(k)} > N$ and $n^{(k-1)} < N$, then $d^{(k+1)} = (e^{(k)} + e^{(k-1)})/2$
b) if $n^{(k)} < N$ and $n^{(k-1)} > N$ then, $d^{(k+1)} = (e^{(k)} + e^{(k-1)})/2$
c) if $n^{(k)} < N$ and $n^{(k-1)} < N$, then
   $d^{(k+1)} = d^{(k)}$
   while ( $d^{(k+1)} \geq e^{(k)}$ ) {
     $d^{(k+1)} = d^{(k+1)} / 2$
   } (35)
d) if $n^{(k)} > N$ and $n^{(k-1)} > N$, then
   $d^{(k+1)} = d^{(k)}$
   while ( $d^{(k+1)} \leq e^{(k)}$ ) {
     $d^{(k+1)} = d^{(k+1)} * 2$
   }

Multi-Pass Versus Single-Pass Approaches

As described earlier, a single-pass approach consists of filter based smoothing followed by fitting. The smoothing filter can be an FIR or an IIR filter, and the fitting can include linear and second-order polynomial fitting in either the forward or backward direction. A single-pass approach is typically best suited for approximating scene-wise, backward reshaping LUTs.

Some embodiments may perform multiple passes. In such a scenario, the polynomial coefficients computed in the first pass are used to regenerate the curve $\Psi^{(1)}(\bullet)$. In the next pass, the regenerated curve is smoothened again with the appropriate filter to be followed by a subsequent fitting process. Pass stages may be repeated until an overall target error is achieved. The multi-pass approach is better suited for frame-wise backward reshaping LUTs. Two specific cases of interest: approximation for a scene-based reshaping function, and approximation for a frame-based reshaping function, and example approximation schemes are discussed next.

Example Process for Approximating a Scene-Based Reshaping Function

In an embodiment, a scene-based reshaping function may be approximated using a single-pass process as illustrated below:

Smooth out the backward LUT $\omega(\bullet)$ (605) with a moving average filter (610) to produce $\Omega(\bullet)$.

Approximate the smooth LUT $\Omega(\bullet)$ with a multi-segment second order polynomial using overlapping constraint (622). Use both the forward and backward fitting and pick the best fit.

If the overlapping constraint fails (623), resort to non-overlap fitting (624). Pick the best fit among the forward and backward fitting.

If the non-overlap condition fails too (625), then apply a piece-wise linear fitting (626) with a continuous-segments constraint.

Figure 6B:
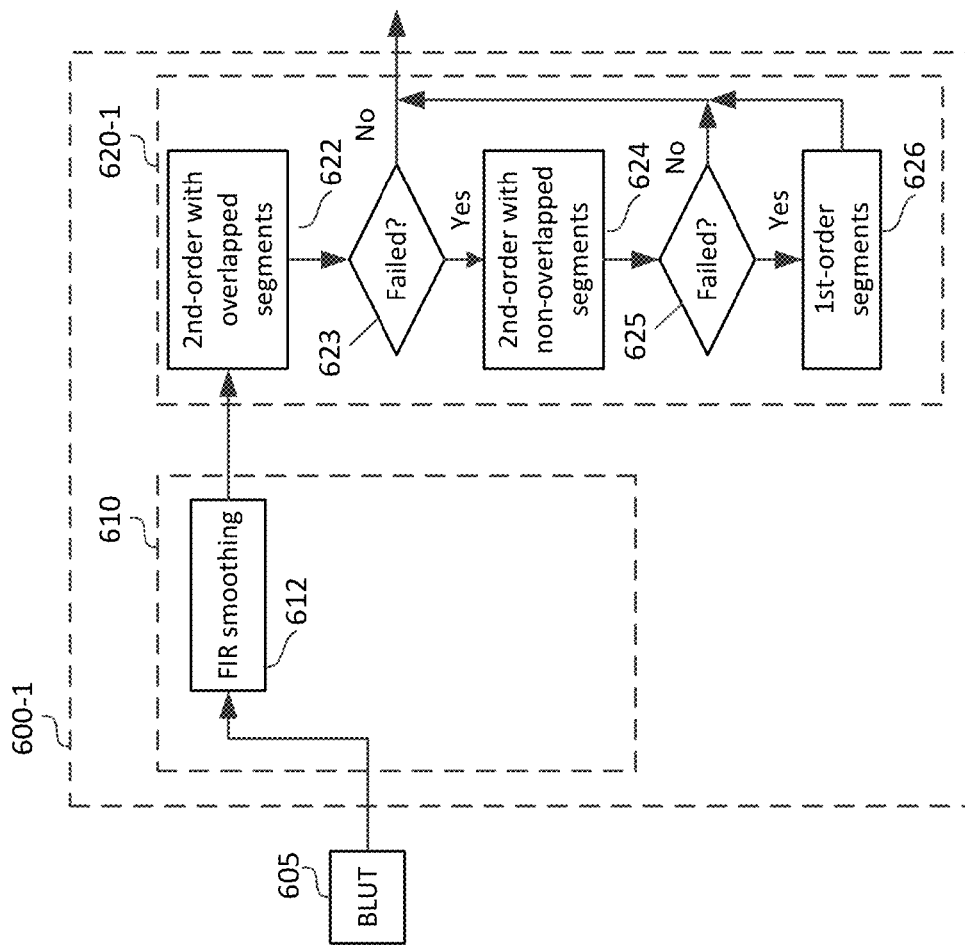

This process is also depicted in FIG. 6B.

Example Process for Approximating a Frame-Based Reshaping Function

In an embodiment, a frame-based reshaping function may be approximated using a two-pass process as illustrated below:

In the first pass (600-1), smooth out the backward LUT $\omega^{(1)}(\bullet)$ (605) with a moving average filter (612-1) to get $\Omega^{(1)}(\bullet)$.

Then (620-1), approximate the smooth backward curve $\Omega^{(1)}(\bullet)$ with a multi-piece second order polynomial using non-overlap fitting (624-1). This coarse fitting is done in forward direction only with a maximum of twenty iterations (K=20).

Create a reconstructed backward LUT $\Psi^{(1)}(\bullet)$ (630)

In a second pass (600-2), smooth out the reconstructed backward LUT $\Psi^{(1)}(\bullet)$ using FIR smoothing (612-2). Here $\omega^{(2)}(\bullet) = \Psi^{(1)}(\bullet)$ and output is $\Omega^{(2)}(\bullet)$.

Approximate the smoothened backward LUT $\Omega^{(2)}(\bullet)$ with a multi-piece second order polynomial with non-overlap fitting (624-2). This is a finer forward fitting, with a maximum of 50 iterations. The initial target maximum distortion $d^{(0)}|_{j=2}$ for the second pass is the last computed fitting error from the first pass.

If no solution is found (625-2), then apply a piecewise linear fitting with continuous constraint.

Figure 6C:
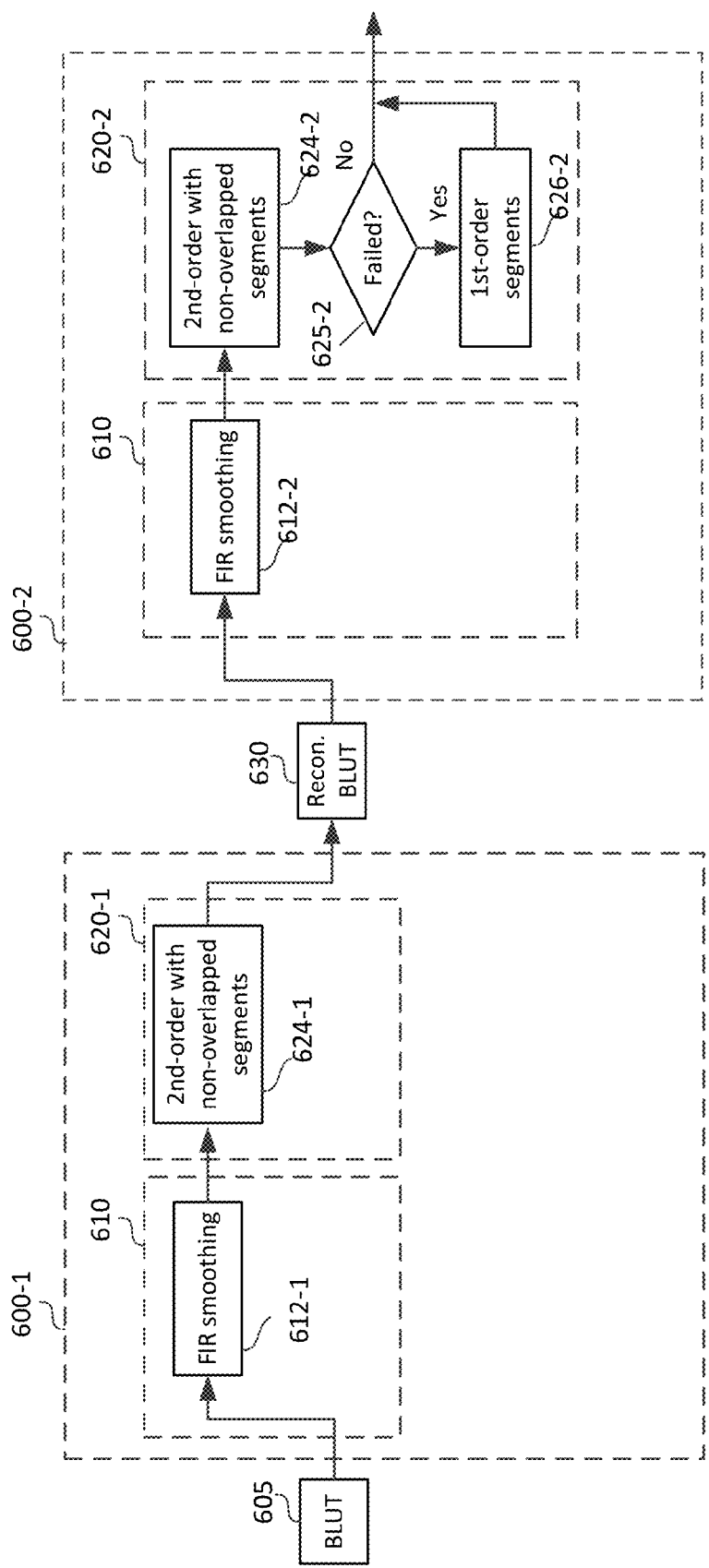

This process is also depicted in FIG. 6C.

In this section, methods and systems for single-pass and multi-pass multi-piece polynomial approximations of a backward reshaping function were discussed. A person skilled in the art will appreciate that the same or similar methods may also be applied to approximate a forward reshaping function or any other tone-mapping or signal quantization function. For example, in an embodiment, a decoder may use both a forward and a backward reshaping function. In such a scenario, a decoder may first reconstruct a forward reshaping function from its multi-piece polynomial approximation received as part of the bitstream, and then use it to reconstruct the corresponding backward reshaping function.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the efficient approximation of a reshaping function, such as those described herein. The computer and/or IC may compute any of a variety of parameters or values that relate to the efficient approximation of a reshaping function processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to the efficient approximation of a reshaping function as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient approximation of a reshaping function are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method in video coding for approximating with a processor a reshaping function using a multi-segment polynomial, the method comprising:
receiving an input image in a first dynamic range and an input reshaping function, wherein applying the input reshaping function to the input image generates an output image in a second dynamic range, wherein the second dynamic range is equal or higher than the first dynamic range;
accessing with a processor a set of input and output points of the input reshaping function;
receiving a number of maximum polynomial segments to represent the input reshaping function;
receiving an initial maximum fitting error;
applying a first smoothing filter to the input reshaping function to generate a first smoothed reshaping function;
generating using one or more iterations a first multi-segment polynomial approximation of the input reshaping function based on one or more multi-segment polynomial approximation algorithms, the first smoothed reshaping function, the number of maximum polynomial segments, and the initial fitting error, wherein, in an iteration of the one or more iterations, a new maximum error fitting criterion is computed based on the number of output segments in the iteration and a fitting error between the smoothed reshaping function and a multi-segment polynomial approximation of the smoothed reshaping function in the iteration;
generating a coded image based on the input image; and
generating a coded bitstream comprising the coded image and a coded representation of the first multi-segment polynomial approximation of the input reshaping function.

2. The method of claim 1, further comprising:
generating a second reshaping function based on the first multi-segment polynomial approximation of the input reshaping function;
applying a second smoothing filter to the second reshaping function to generate a second smoothed reshaping function;
receiving a second maximum fitting error;
generating using one or more iterations a second multi-segment polynomial approximation of the second reshaping function based on the one or more multi-segment polynomial approximation algorithms, the second smoothed reshaping function, the number of maximum polynomial segments, and the second maximum fitting error; and
generating a coded bitstream comprising the coded image and a coded representation of the second multi-segment polynomial approximation of the second reshaping function.

3. The method of claim 1, wherein the first smoothing filter comprises an FIR, moving average, filter or an IIR exponential filter.

4. The method of claim 1, wherein the one or more multi-segment polynomial approximation algorithms comprise an algorithm for approximating a function using overlapped, second-order, segments, an algorithm for approximating a function using non-overlapped, second-order, segments, or an algorithm for approximating a function using non-overlapped, first-order, segments.

5. The method of claim 1, wherein generating using one or more iterations a first multi-segment polynomial approximation of the input reshaping function based on one or more multi-segment polynomial approximation algorithms comprises:
applying a first algorithm for approximating the smoothed reshaping function using overlapped, second-order, segments;
upon failing to generate a valid solution using overlapped segments, applying a second algorithm for approximating the smoothed reshaping function using non-overlapped, second-order, segments; and upon failing to generate a valid solution using non-overlapped segments,
applying a third algorithm for approximating the smoothed reshaping function using non-overlapped, first-order, segments, wherein determining a valid solution comprises (i) testing whether the number of output segments in a multi-segment polynomial solution is smaller or equal to the number of the maximum polynomial segments and (ii) testing whether the fitting error between the smoothed reshaping function and its multi-segment approximation is below a threshold determined based on the first maximum fitting error.

6. The method of claim 5, wherein determining a valid solution further comprises testing whether a reshaping function generated based on the valid solution is monotonically increasing.

7. The method of claim 1, wherein generating using one or more iterations a first multi-segment polynomial approximation of the input reshaping function based on one or more multi-segment polynomial approximation algorithms comprises:

in a first pass, applying a first algorithm for approximating the smoothed reshaping function using overlapped, second-order, segments.

8. The method of claim 7, further comprising:
in a second pass, generating a second reshaping function based on the first multi-segment polynomial approximation of the input reshaping function;
applying a second smoothing filter to the second reshaping function to generate a second smoothed reshaping function;
receiving a second maximum fitting error;
applying a first algorithm for approximating the second smoothed reshaping function using non-overlapped, second-order, segments; and
upon failing to generate a valid solution using non-overlapped segments,
applying a second algorithm for approximating the second smoothed reshaping function using non-overlapped, first-order, segments, wherein determining a valid solution comprises (i) testing whether the number of output segments in a multi-segment polynomial solution is smaller or equal to the number of the maximum polynomial segments and (ii) testing whether a fitting error between the second smoothed reshaping function and its multi-segment approximation is below a threshold determined based on the second maximum fitting error.

9. The method of claim 8, wherein the second maximum fitting error is based on the final computed fitting error in the first pass.

10. The method of claim 8, wherein the maximum number of iterations when applying an algorithm for approximating the second smoothed reshaping function in the second pass is higher than the maximum number of iterations when applying an algorithm for approximating the smoothed reshaping function in the first pass.

11. The method of claim 1, wherein computing a new maximum fitting error in an iteration comprises computing:

a) if $n^{(k)} > N$ and $n^{(k-1)} < N$, then $d^{(k+1)} = (e^{(k)} + e^{(k-1)})/2$
b) if $n^{(k)} < N$ and $n^{(k-1)} > N$ then, $d^{(k+1)} = (e^{(k)} + e^{(k-1)})/2$
c) if $n^{(k)} < N$ and $n^{(k-1)} < N$, then
$d^{(k+1)} = d^{(k)}$
while ( $d^{(k+1)} \geq e^{(k)}$ ) {
$\quad d^{(k+1)} = d^{(k+1)}/2$
}
d) if $n^{(k)} > N$ and $n^{(k-1)} > N$, then
$d^{(k+1)} = d^{(k)}$
while ( $d^{(k+1)} \leq e^{(k)}$ ) {
$\quad d^{(k+1)} = d^{(k+1)} * 2$
} where $n^{(k)}$ denotes the number of output segments at the k-th iteration, N denotes the number of maximum polynomial segments to represent the input reshaping function, $d^{(k)}$ denotes the maximum fitting error at the k-th iteration, and $e^{(k)}$ denotes the measured fitting error at the k-th iteration.

12. The method of claim 1, further comprising:
applying a second smoothing filter to the first smoothed reshaping function to generate a re-smoothed reshaping function; and
generating the first multi-segment approximation based on the re-smoothed function instead of using the first smoothed reshaping function.

13. An apparatus comprising a processor and configured to perform the method recited in claim 1.

14. A non-transitory computer-readable storage medium having stored thereon computer-executable instruction for executing a method with one or more processors in accordance with claim 1.

* * * * *